United States Patent [19]

Raible

[11] Patent Number: 5,008,018

[45] Date of Patent: Apr. 16, 1991

[54] PROCESS FOR THE REDUCTION IN SIZE OF THE PORES OF A FILTER MEDIUM FOR BEVERAGES

[75] Inventor: Karl Raible, Grafelfing, Fed. Rep. of Germany

[73] Assignee: Stabifix Brauerei-Technik GmbH & Co. OHG, Fed. Rep. of Germany

[21] Appl. No.: 298,518

[22] Filed: Jan. 18, 1989

[30] Foreign Application Priority Data

Jan. 18, 1988 [DE] Fed. Rep. of Germany ....... 3801215
Jun. 15, 1988 [DE] Fed. Rep. of Germany ....... 3820393

[51] Int. Cl.$^5$ ............................................. B01D 37/02
[52] U.S. Cl. ..................................... 210/717; 210/728; 210/735; 210/778; 210/805; 210/806; 426/423; 426/495; 426/330.4
[58] Field of Search ................ 210/716, 787, 727, 806, 210/728, 735, 717, 778, 805; 425/423, 495, 330.4

[56] References Cited

U.S. PATENT DOCUMENTS

| | | | |
|---|---|---|---|
| H89 | 7/1986 | Harville et al. ...................... | 426/423 |
| 1,426,596 | 8/1922 | Peck ..................................... | 210/704 |
| 2,573,406 | 10/1951 | Clough et al. ..................... | 426/423 |
| 3,903,316 | 9/1975 | Hoover ................................ | 426/423 |
| 3,993,712 | 11/1976 | Guilbault ............................ | 210/735 |
| 4,027,046 | 5/1977 | Bohm et al. ......................... | 426/423 |
| 4,457,900 | 7/1984 | Steenken ............................. | 210/502.1 |
| 4,631,193 | 12/1986 | Sobus ................................. | 426/330.4 |

FOREIGN PATENT DOCUMENTS

| | | | |
|---|---|---|---|
| 0769529 | 11/1971 | Belgium ............................... | 426/423 |
| 3208022 | 8/1983 | Fed. Rep. of Germany ...... | 426/423 |
| 3304437 | 8/1984 | Fed. Rep. of Germany ...... | 426/423 |
| 3308743 | 9/1984 | Fed. Rep. of Germany ...... | 426/423 |
| 0027376 | 2/1985 | Japan .................................... | 426/423 |
| 2195262 | 4/1988 | United Kingdom ................ | 210/778 |

*Primary Examiner*—Stanley Silverman
*Assistant Examiner*—Krisanne Shideler
*Attorney, Agent, or Firm*—Michael N. Meller

[57] ABSTRACT

The invention relates to a process for the reduction in size of the pores of a filter medium for beverages, preferably beer. Silica sol is added to the beverage to be filtered. In order to be able to reduce the size of the pores of the filter medium in a simple manner and to adjust it to the requirements, upstream of the filter medium through which passes the beverage, silica sol is added continuously or in a batch-feed process using a tank, in such a quantity and controlled such that the silicic-acid precipitation, i.e. the transition from $SiO_2$ primary particles to $SiO_2$ secondary particles, has taken place before the beverage has left the filter medium. The resultant silicic-acid precipitation reduces the size of the pores without sealing them.

24 Claims, No Drawings

PROCESS FOR THE REDUCTION IN SIZE OF THE PORES OF A FILTER MEDIUM FOR BEVERAGES

The invention relates to a process for the reduction in size of the pores of a filter medium for beverages, preferably beer.

The object of the filtration process in the beverages industry is to filter turbidity-causing particles and micro-organisms out of the beverage before it is decanted. It is an essential factor in the beverages industry since the consumer expects a brilliantly clear beverage. Clear filtration is, however, also required for reasons of microbiological stability. All micro-organism cells must be removed from the beverage. This is ensured only if completely clear filtration has taken place.

Many filtering processes are already known in respect of the filtration of beverages. A group of these prior-art processes is characterized in that the beverage is passed through a prefabricated filter cake, e.g. of cellulose, or through a prefabricated filter bed of fibre materials of diverse origins. The other group of prior-art filtering processes is characterized in that settling filtration is carried out. In this connection, pulverulent filter materials are quantitatively added to the flow of liquid. The finely particled filter aids added are subsequently again removed from the flow of liquid via screens or fibre beds. Kieselguhr or cellulose powder, or mixtures thereof, are principally used for settling filtration.

Both in the case of settling filtration and in filtration by means of prefabricated filter media, the size of the pores is dependent on the filter material used, its particle fineness and possibly its fine structure. In the case of the filtration of beverages, the use of kieselguhr as filter medium is particularly advantageous because the means are provided by the selection of suitable types of kieselguhr to adjust both the flow rate and the degree of filtration to the respective requirements. Nevertheless, it does occur in the case of some applications that even the finest kieselguhr cannot hold back turbid components of the beverage.

The "pores" within the meaning of the concept can, for example, be fine structures within the individual particles forming the filter medium (e.g. in the case of kieselguhr), or even interspaces, for example between fibres which form the filter medium.

Cellulose fibres, which are also utilized for the filtration of beverages, form readily permeable filter beds; they are, however, not suitable in many instances for clear filtration because they cannot hold back finely particled turbidity-causing substances. In the past, therefore, cellulose was compacted with asbestos fibres. Since it is necessary to refrain from the use of asbestos for health reasons, attempts are made to increase the degree of filtration by the admixture of kieselguhr. The utilization of cellulose on its own would be advantageous in that the filter medium could be used as feed after use by admixing it, for example, to drafts. This is, however, not possible if kieselguhr in any appreciable quantity is contained in the cellulose.

It has also already been proposed to use starch as filtration medium for settling filtration. This process would likewise have the advantage that, after utilization, the filter medium could be used as feed, i.e. that the disposal of wastes from the brewery presents no particular difficulties, as is the case, for example, with kieselguhr. Using starch, clear filtration is, however, also not possible.

Silicic-acid hydrogels in pulverulent form has also already been recommended as filter aids for settling filtration. Silicic-acid hydrogel is actually used for protein stabilization of beer. Its object is to remove instable colloids from the beer by adsorption. This takes place practically during the filtration of the beer, when the hydrogel is quantitatively added with the kieselguhr filtration to the beer and is again separated in the filter. On the basis of the aforegoing, it is subject to discussion that settling filtration be carried out using only silicic-acid hydrogel, and to dispense with the kieselguhr or other filter aids. This, however, involves considerable difficulties. If a hydrogel powder which is too coarse is used, then the required clarity of the filtrate is not obtained. If it is too finely ground, the filter becomes clogged. In practice, it would therefore be necessary to make available specially ground silicic-acid hydrogel in respect of each beer and, possibly, even in respect of each degree of preclarification.

Powdery synthetic products could also be considered as filter materials, such as have been developed not for filtration but for the adsorption of polyphenolic compounds from beverages, such as, e.g. PVPP or polyamides. In precoating filters, they can be used like kieselguhr, but are of minor value as filter aids because they do not permit clear filtration.

Finally, polymers, especially fibrous polymers, e.g. nylon or Perlon (=polycaprolactam) fibres, polyacrylnitrile fibres or even hollow fibres of polyacrylnitrile, could be considered as materials for filter media. A prerequisite for the utilization of these fibres would, however, be that, prior to use, they had been washed so as to be free of substances which are soluble in the beverage to be filtered. The advantage of these polymer filter media would reside in that, after filtration, they could be regenerated by simple scouring using, for example, dilute soda lye. Application thereof, however, likewise fails since clear filtration cannot be obtained.

On the basis of the aforegoing, the object of the invention is to propose a process of the kind mentioned at the outset by means of which the size of the pores of a filter medium can, in a simple manner, be reduced and adjusted to the requirements.

According to the invention, this object is met in that, upstream of the filter medium through which passes the beverage, continuously or in a batch-feed process using a tank, silica sol is added in such a quantity and controlled such that the silicic-acid precipitation, i.e. the transition from $SiO_2$ primary particles to $SiO_2$ secondary particles, has taken place before the beverage has left the filter medium, and the resultant silicic-acid precipitation reduces the size of the pores without sealing them.

The invention is applied in particular within the framework of a settling-filtration process, whereby the silica sol is added in such a quantity and in such a proportion relative to the filter medium that an adequate filtering effect is achieved without the pores of the filter medium being constricted or completely obstructed.

Essential in the case of this process is that there is sufficient time between the addition of the silica sol and the filtration process for the silicic-acid flocculation, i.e. for the formation of silicic-acid secondary particles from the silicic-acid primary particles. This reaction time, which is determined, for example, by the temperature, but also by the chemical composition of the beverage to be filtered, must be taken into consideration in the process according to the invention. It is usually in the order of a few minutes. Longer reaction times do not, however, have an adverse effect.

All that is important is that the $SiO_2$ secondary particles resulting from the silica sol swell to a certain size so that they are held back in the filter medium in order to reduce the size of the filter pores. It is thus possible to hold back even finely particled turbid components of the beer in the filter medium.

Essential in the case of the process according to the invention is that, in contrast to the state of the art, the silicic-acid flocculation is not removed, but rather that it serves to reduce the size of the filter pores during filtration of the beverage in the filter, in conformity with the object according to the invention.

To this end, it is, in particular, essential that the silica sol is added only in a small quantity. Generally, the silica sol is used in a quantity (calculated as $SiO_2$) of 0,5-20 g of $SiO_2$ /hl of liquid (5-200 ppm), preferably 1-10 g/hl (10-100 ppm) and in particular 2-8 g/hl (20-80 ppm).

The ratio of the quantity of silica sol to the filter medium, as is of importance in particular in the case of precoating filtration, is easily established by the specialist in the field depending on the applicable factors, in particular the type of filter material.

If the quantity of silica sol is too great, the danger arises that the pores of the filter will become completely clogged; if the quantity is too small, the desired action may be inadequate.

The process according to the invention in particular permits the use in the beverages industry of such filter media which, in effect, have too coarse a pore structure to ensure fine filtration, such as the above-mentioned cellulose fibres, starch, silicic-acid hydrogels, powdery or fibrous synthetic products, and the like.

The practical execution of the process according to the invention can be such that, e.g., the intended quantity of silica sol is added to the beverage in the storage tank, e.g. some hours prior to the proposed filtration. Until that process, the silicic-acid precipitation has completely developed. Depending on the size of the storage tank, it is still in suspension, with the result that the process according to the invention can immediately be commenced. If necessary, however, thorough mixing can be provided by the injection, e.g. of carbon dioxide.

A different embodiment of the present invention comprises the treating of a partial quantity of the beverage to be filtered with silica sol, awaiting the development of flocculation and maintaining uniform distribution by suitable means. This partial quantity is then mixed with the remaining beverage to be filtered immediately upstream of the filter.

In order to ensure a uniform compacting of the filter, the silicic-acid flocculation should not settle, in contrast to the processes according to the state of the art, but should be uniformly distributed in the beverage to be filtered.

It may be necessary to remove yeast and coarse sludge from the beverage prior to the addition of silica sol. This may be carried out by employing a centrifuge. This procedural step is of importance in particular when the filter medium used is to be regenerated.

The process according to the invention can, however, also be carried out in that the silica sol is quantitatively added to the wort. Then it is necessary to ensure the required reaction time, optionally by the inclusion of a buffer tank between silica-sol addition and filter. If the operation takes place without a buffer tank, it is expedient at first to switch the filter into circulation (cyclic flow?). It is then possible to perceive whether the required compacting of the pores has taken place by the reduction of the degree of turbidity of the filtrate.

In an advantageous development of the present invention, aqueous gelatine solution is added to the beverage in addition to the silica sol. This results in a more rapid formation of the silicic-acid precipitation and also an influencing of the size of the flakes of the precipitate. An aqueous solution of polyvinyl pyrrolidone (PVP) can also be used as flocculation aid instead of an aqueous gelatine solution.

Silica sol modified with aluminium compounds can advantageously be added.

The filter medium can be composed of kieselguhr, cellulose, starch, silica gel and/or pulverulent or fibrous polymers which are insoluble in water.

The utilization of silica sol for the clarification of beverages and also beer is known, e.g. from DE-OS No. 2 133 906, U.S. Pat. No. 3,878,300, DE-OS No. 3 304 437 and numerous other publications. In the case of all these prior-art processes, the silica sol is, however, used in a fundamentally different process and also with a different action mechanism.

These known processes are based on the fact that, by means of the addition to the beverage of silica sol, a flocculation of disperse silicic-acid hydrogel ($SiO_2$ secondary particles) is produced which is to act adsorbently, relative to the components of the beverage. In the case of beer, it is intended to adsorb cold-instable protein-tannin compounds on the resultant silicic-acid precipitation and then to remove these from the beer together with the silicic-acid precipitation. This is usually carried out by sedimentation or centrifugation.

In order to achieve the desired purpose, a reaction time of several hours must be observed, alone in respect of the adsorption process. The $SiO_2$ separation by sedimentation additionally requires several days, depending on the height of the liquid column. Moreover, in the case of this known process, far greater quantities of $SiO_2$ are required.

In the case of beer, the prior-art processes have the above-mentioned protein-stabilizing effect. In the instance of DE-OS No. 3 304 437, this effect is additionally intensified by bentonite. These processes also cause a certain preclarification of the beer prior to its filtration but which is limited to the removal of only those turbidity-causing substances which, by means of electrical-charge equalization, are adsorbed on to the hydrogel resulting from silica sol and are thereby sedimented. Other turbidity-causing substances of different kinds and origin cannot be adsorbed on to $SiO_2$ hydrogel and can also not be removed from the beer by the known processes.

The process according to the invention also differs from prior-art processes in that it is completely without regard for the occurrence or absence of adsorption processes on the $SiO_2$ precipitations resulting from silica sol. It is sufficient if, after the addition of the silica sol to beer or other beverages, a precipitation of $SiO_2$ secondary structures takes place which are held in the pores of a filter medium. As a result, it is possible to reduce the size of the pores of the filter medium such that all turbidity-causing particles, which are larger than the pores, are held back, irrespective of adsorption processes.

The term silica sol, within the scope of the present invention, preferably designates stabilized silica sols which are produced according to one of the following three processes:

(a) De-alkalization of water glass and stabilization of the low alkali solution by chemical processes;
(b) Peptization of silica gels by suitable processes, e.g. by autoclave heating with small quantities of alkali;
(c) Redispersion of suitable silicic acids in water, e.g. pyrogenic silicic acids.

The processes are described in Ullmann, Volume 21, 1981. The stabilization of the silica sols can be carried out, for example, by the addition of controlled quantities of sodium hydroxide or other basic (alkaline?) substances.

The application of the invention is described by way of the following Examples 1 to 6.

EXAMPLE 1

Beer which, after fourteen-day storage at 0° in a cylindro-conical tank, cannot be filtered by kieselguhr filtration to be clearer than 2 EBC units, is treated as follows: as a first step, the yeast sediment is removed from the cone of the cylindro-conical tank (content 960 hl, tank height 10 m). Then, 14,4 l of 30% silica sol, having a specific surface of 300 m$^2$, diluted with about 20 l of water, is introduced from the top into the tank through the sparge heads (14,4 l silica sol 30%=5,18 kg $SiO_2$/960 hl=5,4 g/hl=54 ppm). After 24 hours, prior to commencing filtration, uniform thorough mixing of the silicic-acid precipitate is provided by a brief injection of carbon dioxide into the tank cone. Subsequently, kieselguhr filtration is carried out. The filtrate has, at commencement, 0,6, and at a later stage 0,4 EBC units. The rise in pressure amounts to 0,2 bar per hour and is, therefore, "normal".

EXAMPLE 2

In large-scale filtration in a brewery, it is evident that beer cannot be clearly filtered, despite the application of the finest kieselguhr (filter cell) available. The beer has a turbidity factor of 5 EBC units after filtration. So much 30%, aluminium-modified silica-sol solution having a specific surface of 300 m$^2$ is added to the aqueous kieselguhr suspension that, in addition to the regulated kieselguhr dosing of 100 g per hectolitre, 20 millilitre of silica sol, i.e. 7,2 g $SiO_2$ per hectolitre are added. After 35 minutes, the turbidity reading downstream of the filter begins to fall spontaneously. It settles at 0,5 EBC units and remains at that value. The rise in pressure in the filter increases slightly by 0,1 bar per hour.

EXAMPLE 3

A small-scale test is carried out, in which unfiltered entire beer from a Munich brewery is subjected to pre-coating filtration on laboratory scale using various filter aids. In this test, the duration of filtration in respect of specified filtrate volumes is established and a filtering factor calculated therefrom, which represents a measure for the speed of filtration (K. Raible and H. Bantleon, "Monatszeitschrift für Brauerei 1968", pp. 277–285).

The very finely filtering kieselguhr Filtercel, by the company Manville, serves as filter aid, and, by way of comparison, a powdery PVPP product. Since this PVPP product does not permit clear filtration, 10 ml/hl and 20 ml/hl silica sol are added in further parallel tests. The silica sol has a specific surface of 100 m$^2$/g and 30% by mass of $SiO_2$.

The results obtained in the test are set out in the Table.

| Quantity added | Filtering factor | Turbidity of the filtrate (EBC unit) |
|---|---|---|
| 100 g/hl Filtercel | 1,40 | 0,6 |
| 100 g/hl PVPP | 0,12 | 1,8 |
| 100 g/hl PVPP +10 ml/hl silica sol | 0,28 | 1,1 |
| 100 g/hl PVPP +20 ml/hl silica sol | 0,70 | 0,75 |
| 100 g/hl PVPP +20 ml/hl silica sol 1 hour reaction time | 0,42 | 0,65 |

It can, firstly, be seen from this Table that the clearly filtering kieselguhr provides a filtering factor of 1,40 and a filtrate having a turbidity of 0,6 EBC units. In contrast thereto, when adding the PVPP powder, a filtering factor of 0,12 is obtained. This PVPP powder therefore permits a more than tenfold filtration speed. It does, however, have the drawback that it does not filter clearly, since the filtrate has an EBC turbidity factor of 1,8 units. When 10 ml/hl silica sol are added in addition to the PVPP powder, then the filter is clearly compacted (filtering factor 0,28) and, at the same time, yields a clearer filtrate having 1,1 EBC units, although this does not yet have the clarity of the Filtercel filtrate. Increasing the addition of silica sol to 20 ml/hl, further raises the filtering factor and, at the same time, also provides an improvement in the clarity. Finally, in the last test, after the addition of the PVPP and of 20 ml/hl silica sol, a reaction time of 1 hour was provided, prior to filtration being carried out. This then shows that the extended reaction time distinctly increases the clarity of filtration and this with simultaneous reduction of the filtering factor, i.e. improvement of the filtration rate in comparison with the test using the same quantity but without reaction time.

The above test demonstrates as to how, as a result of the utilization according to the invention of silica sol for the compacting of the filter cake, the means is provided to utilize an adsorption means, which was actually designed only for protein stabilization, also as a complete filter aid. After filtration, the PVPP is washed with dilute soda lye to be freed of the adsorbed polyphenolic compounds. At that time, the small quantity of silicic acid from the silica sol and deposited in the filter cake, is dissolved and is again removed from the PVPP powder. The PVPP can again be used for filtration and stabilization.

A pulverulent polyamide product in principle produced similar results.

EXAMPLE 4

A laboratory test is carried out under the same test conditions as given in Example 3. The comparison is by means of the filtration properties of potato starch with simultaneous addition of 10 ml/hl silica sol. The results of this test are set out in the Table:

| Quantity added | Filtering factor | Turbidity of the filtrate (EBC unit) |
|---|---|---|
| 100 g/hl Filtercel | 1,15 | 0,60 |
| 100 g/hl starch | 0,45 | 1,9 |
| 100 g/hl starch | 0,88 | 0,75 |

-continued

| Quantity added | Filtering factor | Turbidity of the filtrate (EBC unit) |
|---|---|---|
| +10 ml/hl silica sol 100 g/hl starch +10 ml/hl silica sol 1 hour reaction time | 0,65 | 0,60 |

It can be seen here that the clearly filtering kieselguhr Filtercel provides a filtering factor of 1,15 and a clarity of the filtrate of 0,60 EBC units. Under identical test conditions, filtration with pulverulent potato starch produces a filtering factor of 0,45. Under otherwise identical test conditions, the beer is, therefore, filterable three times as rapidly using starch than with Filtercel. The clarity of the filtrate of 1,9 EBC units however precludes the use of the starch as filter aid. By means of the addition of 10 ml/hl of silica sol, the filter cake can be compacted, with the result that it then also provides a filtrate of 0,75 EBC units, i.e. almost the filtration clarity of the kieselguhr-Filtercel, although with distinctly improved filtering flow rate. If the addition of the filter aids is advanced, so that there is a reaction time of 1 hour between addition and filtration, then this will result in a further improvement of the filtration clarity with simultaneous increase of the filtering flow rate. In the case of this test, using starch and silica sol, it is possible to filter nearly twice as rapidly than with the use of kieselguhr Filtercel, with the same clarity of the resultant filtrate.

After filtration, the starch can be used as feed. 3,6 g $SiO_2$ are present in 100 g starch from 10 ml/hl of 30% silica sol. Since the used filtration starch is, in any event, used as feed together with the draffs, the small silicic-acid component is nutrition-physiologically insignificant and, moreover, not detectable during feedstuffs analysis.

Similar results were obtained in small-scale tests in which cellulose fibres were used instead of starch.

EXAMPLE 5

Small-scale test using unfiltered entire beer from a Munich brewery as in Examples 3 and 4.

The suitability of polyacryl nitrile hollow fibres as aid in beer filtration is examined. Available is a test product detx 2,2/0,6 mm. The length of the individual fibres is 0,6 mm, the outside diameter of the hollow fibres approximately 20 u. The polyacryl nitrile is resistant to dilute alkaline solution and acid and could, therefore, be included as filter aid capable of being regenerated.

In the case of the test, the beer is filtered using 100 g/hl kieselguhr Filtercel and, by way of comparison, with 100 g/hl of the polyacryl nitrile fibres. Finally, in a further test, together with the synthetic fibres, 20 ml/hl of 30% silica sol, specific surface 100 m²/g of $SiO_2$ are also brought into contact with the beer, and filtering takes place after a reaction time of 1 hour. The results are set out in the following Table:

| Quantity added | Filtering factor | Turbidity of the filtrate (EBC units) |
|---|---|---|
| 100 g/hl Filtercel | 1,10 | 0,7 |
| 100 g/hl polyacryl nitrile fibres | 0,62 | 1,7 |
| 100 g/hl polyacryl nitrile fibres +20 ml/hl silica sol | 0,92 | 0,75 |

In this test, too, the filter cake of polyacryl nitrile fibres could be compacted using silica sol, with the result that a clear filtrate was provided which almost had the brilliance of the Filtercel filtrate.

The advantage of the utilization of the synthetic fibres, in comparison with the filtration using kieselguhr, resides in that the synthetic fibres can be washed with dilute soda lye and, after rinsing of the lye, can again be used for filtration.

EXAMPLE 6

Small-scale test using unfiltered entire beer from a Munich brewery as in Examples 3-5.

The beer to be tested is cooled to 0° C., and subsequently small-scale filtration is carried out. The following are used:

(1) 100 g/hl kieselguhr "Filtercel"
(2) 100 g/hl silicic-acid hydrogel "Lucilite"
(3) 100 g/hl silicic-acid hydrogel "Lucilite"+3,6 g/hl $SiO_2$ as silica sol having a specific surface of 300 m²
(4) 100 g/hl silicic-acid hydrogel "Lucilite"+3,6 g/hl $SiO_2$ as silica sol having a specific surface of 100 m².

In tests Nos. 3 and 4, a reaction time of 1 hour is included between the addition of the silica sol and the carrying out of the filtrate.

The filtration test produces the following results:

| Quantity added | Filtering factor | Turbidity of the filtrate (EBC units) | Cold turbidity after 1 hot day 40° C. |
|---|---|---|---|
| 100 g/hl kieselguhr-Filtercel | 1,25 | 0,7 | 0,95 |
| 100 g/hl silicic-acid hydrogel "Lucilite" | 0,25 | 1,25 | 0,6 |
| 100 g/hl silicic-acid hydrogel "Lucilite" +3,6 g/hl $SiO_2$ as silica sol (300 m²) | 1,10 | 0,7 | 0 |
| 100 g/hl silicic-acid hydrogel "Lucilite" +3,6 g/hl $SiO_2$ as silica sol (100 m²) | 0,35 | 0,9 | 0,2 |

The above test shows that the hydrogel "Lucilite" filters about five times as rapidly as the finely filtering kieselguhr Filtercel. The filtrate is, however, not clear, having 1,25 EBC units. When, in addition to the hydrogel, silica sol having a surface of 300 m² is also added, then the filtering factor approachs that of the kieselguhr Filtercel. Filtration is, therefore, considerably slowed down. In return, however, a filtrate is obtained which is as clear as in the case of Filtercel.

The silica sol having a specific surface of 100 m² compacts the Lucilite filter cake only relatively little, since the filter-cake factor increases only from 0,25 to 0,35. Nevertheless, a distinct improvement of the clarity of the filtrate is observed.

In the case of the short forced test with 1 warm day 40° C. (?), it is found that the Filtercel filtrate has a cold turbidity of 0,95 EBC. The Lucilite filtrate is slightly better, although it still has 0,6 EBC units cold turbidity, while the filtrate from the combination of Lucilite/silica sol 300 m$^2$ remains bright. The silica sol having 100 m$^2$ specific surface is not quite as effective.

I claim:

1. A process for filtering a beverage wherein a stabilized silica sol is used for reducing the size of the pores of the filter medium without sealing them comprising adding a stabilized silica sol continuously or batchwise to the beer to be filtered upstream of the filter medium through which the beer passes, in a quantity and control such that the silicic acid precipitation, which is the transition from SiO$_2$ primary particles to SiO$_2$ secondary particles, takes place before the beer leaves the filter medium but without the settling of the silicic acid secondary particle, wherein primary particle are SiO$_2$ particle of the silica sol and secondary particles are a silici acid hydrogel, whereby the resultant silicic acid precipitation reduces the size of the pores without sealing them.

2. Process according to claim 1 wherein, in addition to the silica sol, an aqueous gelatin solution or an aqueous solution of polyvinyl pyrrolidone (PVP) is added to the beverage as a flocculation aid.

3. Process according to claim 1 wherein silica sol modified with aluminium compounds is added.

4. Process according to claim 1 wherein the silica sol is added in a quantity (calculated as SiO$_2$) of 0.5–20 g of SiO$_2$/hl of liquid.

5. Process according to claim 1 wherein the filter medium is selected from the group consisting of kieselguhr, cellulose, cellulose fibres, starch, silica gel, silicic-acid hydrogels, powdery or fibrous synthetic products and pulverulent or fibrous polymers which are insoluble in water.

6. Process according to claim 1 wherein the time control of the silica-sol addition is conducted such that a silica-sol precipitation, which is adequate for the reduction in size of the filter pores, has already taken place, but that the waiting period is not so long that the settling of the secondary particles process has also taken place.

7. Process according to claim 1 wherein the time between the addition of the silica sol and the filtration process, which is the reaction time for the formation of silicic acid secondary particles from the silicic acid primary particles, is for a few minutes.

8. Process according to claim 7 wherein the silica sol is quantitatively added to the beverage stream.

9. Process according to claim 8 wherein the same beverage stream is re-circulated through the filter until the required compacting of the pores of the filter has taken place.

10. Process according to claim 8 wherein the partial quantity of beverage is mixed with the remaining beverage to be filtered immediately upstream of the filter.

11. Process according to claim 7 wherein a partial quantity of the beverage to be filtered is held in the presence of silica sol until development of flocculation therein begins, and is maintained in uniform distribution and that said partial quantity of beverage is then mixed with the remaining beverage to be filtered.

12. Process according to claim 11 wherein the partial quantity of beverage is mixed with the remaining beverage to be filtered immediately upstream of the filter.

13. The process of claim 11 wherein the beverage is beer.

14. Process according to claim 1 wherein the silica sol is quantitatively added to the beverage stream.

15. Process according to claim 14, wherein a buffer tank is provided between silica-sol addition and the filter.

16. Process according to claim 14 wherein the same beverage stream is re-circulated through the filter until the required compacting of the pores of the filter has taken place.

17. The process of claim 16 wherein the beverage is beer.

18. Process according to claim 1 wherein a partial quantity of the beverage to be filtered is held in the presence of silica sol until development of the flocculation therein begins, and is maintained in uniform distribution and that said partial quantity of beverage is then mixed with the remaining beverage to be filtered.

19. Process according to claim 18 wherein the partial quantity of beverage is mixed with the remaining beverage to be filtered immediately upstream of the filter.

20. The process of claim 19 wherein the beverage is beer.

21. The process of claim 18 wherein the beverage is beer.

22. The process of claim 1 wherein the beverage is beer.

23. Process according to claim 1 wherein the silica sol, calculated as SiO$_2$, is added in a quantity of 1–10 g of SiO$_2$/hl of liquid.

24. Process according to claim 1 wherein the silica sol, calculated as SiO$_2$, is added in a quantity of 2–8 g of SiO$_2$/hl of liquid.

* * * * *